United States Patent [19]

DeHart

[11] 4,302,899
[45] Dec. 1, 1981

[54] HUNTERS AND TRAPPERS SCENT PAD

[76] Inventor: George DeHart, 3025 S.W. 21st, Oklahoma City, Okla. 73108

[21] Appl. No.: 154,505

[22] Filed: May 29, 1980

[51] Int. Cl.³ ............................................. A01M 3/00
[52] U.S. Cl. ...................................................... 43/1
[58] Field of Search ........................ 43/1, 124, 131; 15/244 R; 422/122, 300; 24/3 F, 3 H, 3 J; 224/218, 230, 252, 269, 920

[56] References Cited

U.S. PATENT DOCUMENTS

| 941,200 | 11/1909 | Jones | 422/300 X |
| 2,262,340 | 11/1941 | Shalko | 224/230 X |
| 2,961,677 | 11/1960 | Zecchini | 75/244 R X |
| 3,046,192 | 7/1962 | Bilyeu | 43/1 X |
| 3,378,873 | 4/1968 | Strout | 15/244 R |
| 3,583,016 | 6/1971 | McConnell | 15/244 R X |
| 4,186,502 | 2/1980 | Foster | 43/1 X |

FOREIGN PATENT DOCUMENTS 1021624 1/1957 Fed. Rep. of Germany ............ 43/1

Primary Examiner—James G. Smith

[57] ABSTRACT

This device is unique, in that it employs an aromatic scent in a sponge, for attracting animals. It consists primarily of the sponge, that is impregnated with a few drops of deer lure or other lure, and it includes a plastic housing that is provided with a spring clip, for attaching it to any desired area, such as a shirt, a cap, a vest, a tree limb, etc.

1 Claim, 9 Drawing Figures

HUNTERS AND TRAPPERS SCENT PAD

This invention relates to hunting accessories, and more particularly, to a hunters' and trappers' scent pad.

It is the principal object of this invention to provide a hunters' and trappers' scent pad, which will be of such structure, that it may be secured removably to a garment, for use by hunters in attracting game towards them.

Another object of this invention is to provide a hunters' and trappers' scent pad, which will employ a sponge, upon which will be placed a few drops of lure.

Another object of this invention is to provide a hunters' and trappers' scent pad, which will employ the use of a plastic housing, in which, the sponge member is removably received, and the housing will be attached to either the aforementioned garment, or to an animal trap.

A further object of this invention is to provide a hunters' and trappers' scent pad, which will have spring clip means, for enabling it to be attached to a tree, etc.

Other objects are to provide a hunters' and trappers' scent pad, which is simple in design, inexpensive to manufacture, rugged in construction, easy to use, and efficient in operation.

These, and other objects, will be readily evident, upon a study of the following specification, and the accompanying drawing, wherein.

Figures 1, 2:
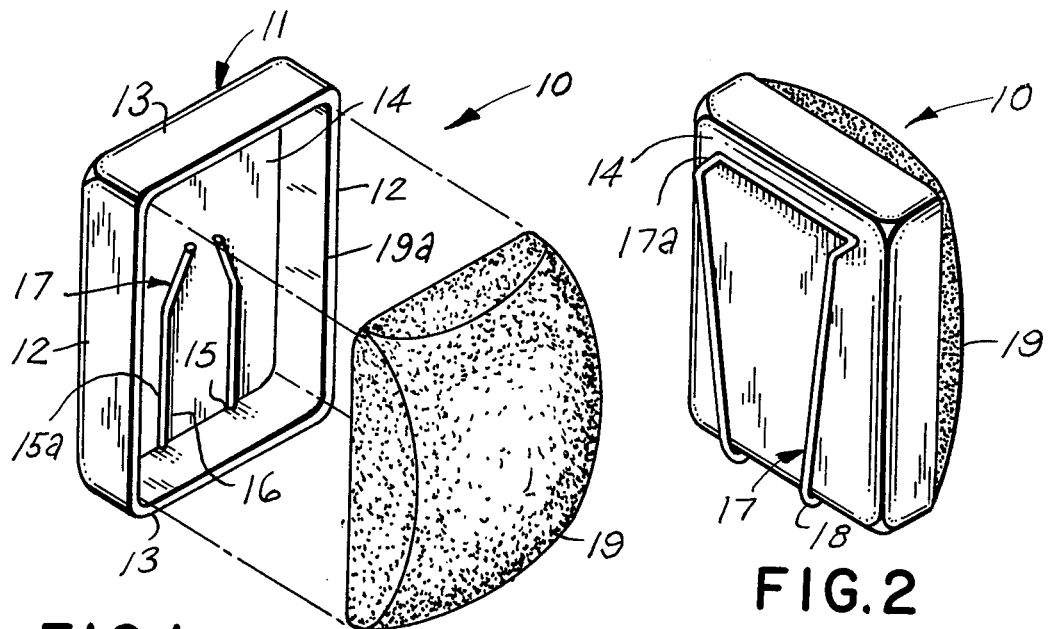
FIG. 1 is a partially exploded view of the present invention.
FIG. 2 is a perspective view of the rear of FIG. 1, showing the sponge member in place.
Figure 4:
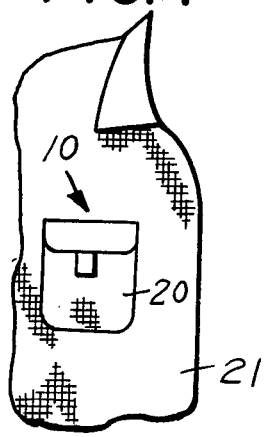
Figure 5:
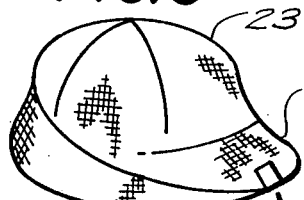
Figure 3:
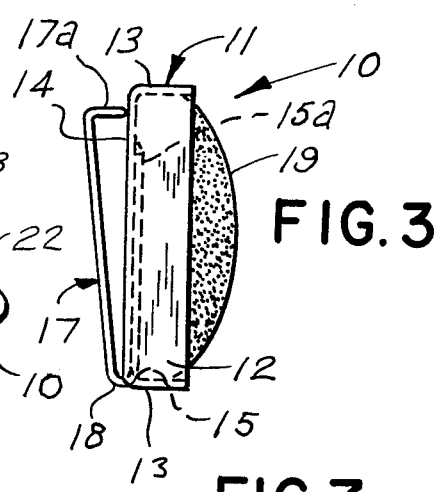
FIG. 3 is a side view of the assembly, shown in elevation.
Figure 6:
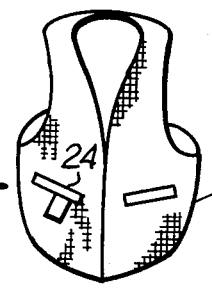
Figure 7:
Figure 8:
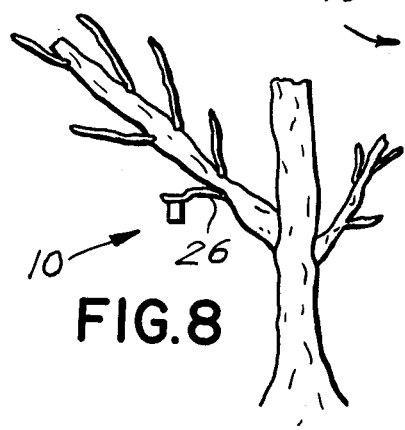

FIGS. 4, 5, and 6 illustrate the mounting of the present invention to wearing apparel;

FIG. 7 illustrates another placement of the invention, such as upon a rock, mound of soil, etc.;

FIG. 8 illustrates the invention mounted onto a tree branch, and

Figure 9:
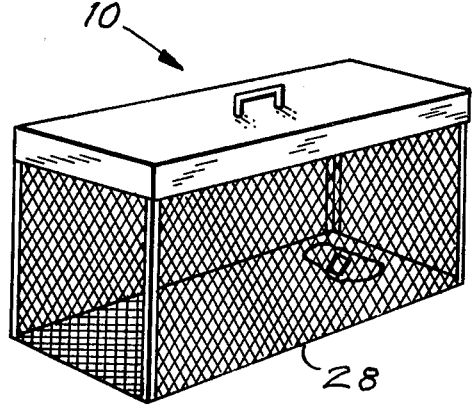

FIG. 9 is a perspective view of an animal trap, illustrating the invention enclosed therein.

According to this invention, a scent pad 10 is shown to include a plastic housing 11, which includes a pair of side walls 12, a pair of end walls 13 and a back wall 14, that are molded of plastic, integral with each other. A pair of spaced-apart openings 15, in one of the end walls 13, receives the ends 15a of a steel spring clip 17, and the bottom portion 18 of spring clip 17 abuts with an end wall 13 of housing 11, the upper portion being in abutment with the outer surface of back wall 14. A sponge 19, of suitable material, is removably and frictionally received within the opening 19a of housing 11, and it will be noted, that the material of housing 11 and the sponge 19 will be such, that they will have little or no aroma, so as not to interfere with the scent produced by pad 10.

In use, the hunter or trapper places a few drops of his favorite buck or animal lure onto the sponge 19, and the housing 11 may be placed in any desired location.

For example, scent pad 10 may be clipped to pocket 20 of the hunter's shirt or jacket 21. It also may be placed on the bill 22 of cap 23, or it may be clipped to pocket 24 of vest 25.

It may also be placed upon a tree limb 26, a rock or mound 27, or in a trap 28, etc.

While various changes may be made in the detail construction, it is understood that such changes will be within the spirit and scope of the present invention, as is defined by the appended claims.

What I now claim is:

1. A hunter's and trappers' scent pad, comprising, in combination, a box-shaped, rectangular housing, a sponge supported in said housing and a mounting means on said housing for support from any of various objects; said housing including a pair of opposite side walls, a pair of opposite end walls and a back wall formed together, a front opening on said housing frictionally receiving said sponge; and said mounting means comprising a steel spring clip formed with a generally "U"-shaped portion that bears against an outer, rear side of said back wall, and a pair of legs that bear against an inner, front side of said back wall, said legs being inserted through a pair of spaced-apart openings formed in said housing along an edge between one said end walls and said back wall; and said sponge having a few drops of animal lure placed thereon so as to attract game.

* * * * *